Jan. 31, 1928.

F. B. MORAN

DRIVING SHIELD

Filed Aug. 14, 1925

Re. 16,862

Frank B. Moran

INVENTOR.

BY G. C. Waldrop

ATTORNEY.

Reissued Jan. 31, 1928. Re. 16,862

UNITED STATES PATENT OFFICE.

FRANK B. MORAN, OF DALLAS, TEXAS.

DRIVING SHIELD.

Original No. 1,643,509, dated September 27, 1927, Serial No. 50,164, filed August 14, 1925. Application for reissue filed October 19, 1927. Serial No. 227,338.

This invention relates to eye shields for motorists and it has particular reference to that type of shield in the form of spectacles, goggles or eyeglasses employed while driving, the glasses of which are provided with sections of different colors, to function as shields for the eyes at different angles from which the objectionable glare may come, and the primary object of the invention comprehends a shield having such glasses but which are constructed in such a manner as to afford in cases of night driving especially, a view of the entire road for a limited distance, a view of half the road for a limited distance, and finally permitting a view of the road only through the shaded portions of the glass, to shield the eyes from distance approach of lights.

The invention further contemplates the provision of disc shields, by the utilization of which at no time is the vision entirely obliterated by the position of the discs, in an effort to shield the eyes from glaring headlights or rays of the sun, and further, discs which may be rotated to effect neutralization of glaring lights at angles from which they come.

With the foregoing objects and advantages in view, the invention has particular reference to the novel construction of the discs, by which these and other objects are attained, such construction will be manifested and made clear in the course of the following detail description and illustrated in the appended drawings, wherein.

Figure 1:
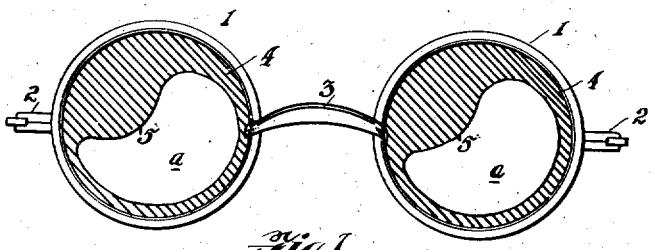
Figure 1 represents a spectacle frame of the usual type, showing discs constructed in accordance with the present invention, rotated to a point of advantage for usual night driving.

In employing similar characters of reference in proceeding, the Figure 1 illustrates the ordinary spectacle frame having rims 1, straps 2 and bridge 3, and in which are shown discs 4, constructed according to the present invention.

It is a known fact that various forms and types of eye shields and driving shields have been contemplated in which sectional lenses have been incorporated, consisting of glass and like material of different shades, with an effort to lessen the danger incident to night driving. The present invention however, affords discs in substitution of lenses, constructed preferably of non-breakable, translucent material or its equivalent, in which visional apertures are arranged of preferably apostrophic shape, as illustrated, forming a protuberance 5, converging to a point adjacent the geographical center of the disc.

In Figure 1, which illustrates a view in correct position on the eyes, the discs are shown to be rotated to dispose the protuberances 5 over the upper left side of the eyes. As in most cases, driving to the right is adhered to, and in this regard, the protuberances 5 effectively shield the eyes from the blinding glare of an approaching light on the left, simultaneously permitting the wearer to discern the right side of the road with unobstructed vision, as the semi-transparency of the discs 4 neutralizes the objectionable glare, while the lobes of the apertures *a*, afford a greater view of the road to a predetermined point distant from the wearer thereof. No rotation of the discs 4 is required, except to adjust the protuberances to change the vision to accord with the angle from which the objectionable glare may come.

Figure 2:
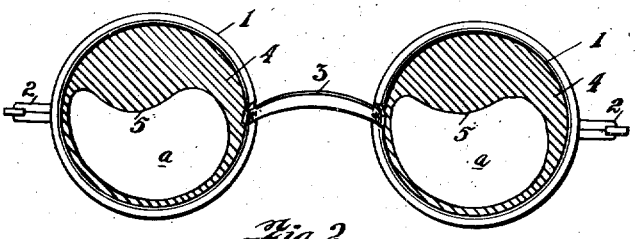
Figure 2 is a similar view illustrating the manner in which the discs are disposed to shield the eyes in advancing toward the sun.

Referring to Figure 2, the discs are positioned to expedite driving toward the sun. In this instance, the protuberances 5 are disposed directly above the eye, to permit the line of vision to pass directly therebeneath, whereby to shade the eyes from the glaring rays of the sun, on a line with the horizon, simultaneously permitting unobstructed view of the road and either side thereof.

It is well established that a divisional line disposed diametrically of the glass, whether it be centrally situated or otherwise, to afford colored shades, is annoying to the vision, and prohibits a clear unobstructed view of the road. The present invention provides discs which are arranged to shield only that part of the vision subjected to the objectionable rays of light, in such a manner as to avoid the necessity of incorporation of an irritating divisional line, leaving an unobstructed area of greater dimensions than the translucent portion, provided as a shield. However, at no time is the vision totally obliterated by the shields, due to the semi-transparency of the shaded portion.

The upper marginal edges defined by the openings *a* are comprised of a central convex part flanked by concave side parts, the edges being integral, and continuous and presenting a single line to the eye, which line is of gradual curvature so as to be devoid of abrupt or harsh portions, thereby to intercept vision with a minimum strain or stress on the eye.

The invention has been described as embodying discs wherein the transparency of the central portion thereof is obtained through an aperture, but it should be herein understood that transparent glass or its equivalent may be substituted for these apertures, also the described shape thereof may be slightly altered to attain similar results, without departing from the spirit or intent of the invention as set forth in the following claims.

I claim:—

1. In driving goggles, a frame, a pair of semi-transparent discs in the frame, said discs having curved openings, which latter are formed at their inner edges to each have a concave intermediate portion and convex end portions, one of which latter is larger than the other and disposed to one side of a vertical line drawn diametrically through the discs, whereby said discs have enlarged portions disposed to one side of said line and at the opposite ends of the enlarged portions of the openings.

2. In driving goggles, a frame, a pair of semi-transparent discs in the frame having curved clear vision portions, which latter are formed at their inner edges to each have a concave intermediate portion and convex end portions, one of which latter is larger than the other and disposed to one side of a vertical line drawn diametrically through the discs, whereby said discs have enlarged portions disposed to one side of said line and at the opposite ends of the enlarged portions of the openings.

3. A driving shield, comprising a body of semi-transparent material, said body having a curved lower edge which is formed to have a convex intermediate portion and concave end portions, one of which latter is larger than the other, the convex intermediate portion being disposed to one side of a vertical line intercepting the center of the field of vision.

In testimony whereof I affix my signature.

FRANK B. MORAN.